Patented Nov. 6, 1928.

1,690,160

UNITED STATES PATENT OFFICE.

CARLETON ELLIS, OF MONTCLAIR, NEW JERSEY.

RESINOUS COMPOSITION CONTAINING SULPHUR AND PROCESS OF MAKING SAME.

No Drawing.        Application filed December 19, 1922. Serial No. 607,909.

This invention relates to a resinous compound prepared by reacting on a phenol or phenolic body with sulphur to form a resinous compound.

Phenol, cresols and various phenolic bodies, naphthol and the like react with sulphur especially in the presence of a basic catalyst including various alkaline substances such as sodium or potassium carbonate to form products more or less resinous. In the present invention it is an object to produce a resinous material which contains a high content of combined sulphur thereby giving a resin of a high melting point suitable for a number of purposes, as for example for incorporating with wood flour and other fillers on milling rolls to produce molding compositions, or for use in other ways where a resin of fairly high melting point is desired. In the present invention a quantity of sulphur not less than the amount of phenol is taken, and generally I prefer to use sulphur considerably in excess of the weight of the phenol. Thus 50 parts by weight of ordinary phenol, 80 parts sulphur and from about 1 to 10 parts of potassium carbonate are heated to 135–140° C. for about 4 hours and the temperature raised to 160° C. for another 4 hours. During the heating, reaction takes place with the evolution of hydrogen sulphide. A hard resin results having no very sharp melting point but slowly liquefying in the neighborhood of 130–140° C. By varying the proportions of sulphur the melting point may be modified. In the above example, I have referred to 80 parts of sulphur to 50 parts of phenol, this being merely illustrative. I prefer to employ considerably more of sulphur as distinguished from practically equal quantities, or less of sulphur than of phenol. I am aware that in Blumfeldt's Patent No. 1,435,801, a possible construction of the proportions as stated would be 96 parts of sulphur to 94 parts of phenol. I employ quantities of sulphur which are considerably more (e. g. 8 to 5, as above given in the example) rather than 2% more, 96 to 94 would of course be considered as a very inconsiderable amount of sulphur over the amount of phenol.

In making molding compositions from this material it may be observed in some cases that hydrogen sulphide is evolved while working on the rolls or hot pressing and a product better adapted for the purpose may be obtained by deodorizing as for example by blowing the molten resin with air, steam or inert gas.

Sometimes the odor of the resin is caused by the presence of an alkaline catalyst such as a sulphide or a basic substance which during the heating has become a sulphide and on exposure to the air is gradually converted to a carbonate with the evolution of hydrogen sulphide. It is important to wash out or destroy such a catalyst producing a disagreeable odor, for various reasons. Aside from the objection that the gases given off during molding may be quite objectionable to the operators, there is the further danger that hydrogen sulphide may act upon the steel molds usually employed blackening them and destroying the surface finish; molded articles made therein would not have the proper appearance. The catalyst may be neutralized by various acids such as mineral acids, acetic, stearic acids and the like. In the case of resins which are made with lesser quantities of sulphur and are soluble in various solvents, the resin solution may be neutralized or washed to remove catalyzer or hydrogen sulphide. The procedure of deodorization applies to sulphur resins irrespective of the proportion of combined sulphur which they contain.

If a basic catalyst is used in making the resin which does not evolve hydrogen sulphide in objectionable amounts, this catalyst may be allowed to remain.

A resin obtained according to the foregoing proportions is only very slightly soluble in common organic solvents; for example it is only slightly soluble in benzol and alcohol but somewhat more soluble in a mixture of these solvents, or in a mixture of benzol and acetone. It is practically insoluble in solvent naphtha. By thus using a proportion of sulphur which yields a practically insoluble resin which also possesses a fairly high melting point the product may be used as a binder in plastics, alone or with other resinous bodies, fillers, coloring materials, etc.

When a considerable amount of a basic catalyst has been added to the reaction mixture to facilitate resinification and the presence of this catalyst is undesirable in the finished product it may be removed by grinding and washing or by any other suitable elimination method. Thus the resin may be dissolved in aqueous caustic soda solution, the latter acidified to precipitate the resin and the latter washed free of salts. When catalysts other than bases are employed a similar procedure may be utilized if desired. Phenols, cresols, naphthols and phenolic bodies from low temperature tar, or coal tar itself likewise water gas tar and other tars may be treated with sulphur with or without a catalyst heating at atmospheric pressures or pressures above or below atmospheric pressure to form sulphurized compounds containing sufficient sulphur to produce insolubility without causing infusibility.

The term "phenolic bodies" is employed herein as covering broadly phenols, cresols, naphthols and substances containing the same.

What I claim is:—

1. A deodorized fusible resin free from hydrogen sulphide and free from other soluble sulphides, formed by heating a phenolic body with at least 1.6 times its weight of sulphur in the presence of an alkaline catalyst.

2. The process of making a fusible resin, partly soluble in common organic solvents which comprises reacting on a minor proportion of a phenolic body with a major proportion of sulphur in the presence of an amount of an alkaline catalyst constituting a minor fraction only of the amount of the phenolic body, at an elevated temperature whereby resinification takes place, the temperature being carried to substantially above 140° C., during some portion of the resinification reaction.

3. The process of making a deodorized resin which comprises heating phenol and sulphur in the presence of an alkaline catalyst until the sulphur has substantially combined and blowing the hot resinous product obtained with a deodorizing fluid.

4. The process of making a hard fusible resin which comprises heating 5 parts of a phenol with not substantially less than 8 parts of sulphur, in the presence of an amount of potassium carbonate representing a minor fraction of the amount of said phenol, until the sulphur is substantially combined.

5. The process of making a deodorized resin which comprises heating 5 parts of a phenolic body with not substantially less than 8 parts of sulphur in the presence of an alkaline catalyst until the sulphur has substantially combined and blowing the hot resinous product obtained with a deodorizing fluid.

6. A process which comprises heating a mixture of phenol with considerably more than its weight of sulphur, to about 135–140° C., in the presence of a minor fraction only of an alkaline catalyst, for several hours and then raising the temperature to about 160° C., for several hours.

7. A phenol-sulphur resin which does not exhibit a sharp melting point but which fuses at about 130 to 140° C.

8. A resin derived from sulphur and a phenolic body, which resin is only very slightly soluble in benzol, alcohol and acetone separately, but which is substantially more soluble in mixtures of benzol and alcohol and in benzol and acetone.

CARLETON ELLIS.